Feb. 23, 1954 — W. H. McELVENNY — 2,670,001
ELECTRIC CONTROL FOR MOTORS
Filed March 30, 1951 — 2 Sheets-Sheet 1

INVENTOR.
William H. McElvenny

Feb. 23, 1954

W. H. McELVENNY 2,670,001

ELECTRIC CONTROL FOR MOTORS

Filed March 30, 1951

INVENTOR.
William H. McElvenny
BY Browne, Jackson,
Boettcher & Dienner
Attys.

Patented Feb. 23, 1954

2,670,001

UNITED STATES PATENT OFFICE 2,670,001

ELECTRIC CONTROL FOR MOTORS

William H. McElvenny, Drexel Hill, Pa., assignor to Crane Packing Company, Chicago, Ill., a corporation of Illinois Application March 30, 1951, Serial No. 218,339

5 Claims. (Cl. 137—49)

This invention relates generally to an electric control for motors and more particularly to such a control as shuts off the power means to the motor when the motor, or an element driven thereby, such as a shaft or tool, has its speed reduced to a predetermined level by a load.

While the control of my invention may be widely employed for a variety of uses, it will be described in connection with an air motor, and, more particularly, an air motor used in connection with a tube expanding tool. It will be understood, however, that the invention is not to be limited by the preferred, illustrated embodiment, since it may be employed in connection with motors driven by other sources of power and in connection with other tools. Furthermore, it is not an essential aspect of this invention that the control be embodied partially in a motor which is portable, although it is advantageously used in connection with portable motors and tools driven thereby.

Where, for example, the end of a tube is to be expanded for fluid-tight association with an aperture in a head of a condensor, it is important that the tool not work the end of the tube any more than is required for a fluid-tight fit, since excessive working may harden the tube to the point where normal expansion and contraction of the tube when in use will cause it to crack or break off and leak. If, on the other hand, the tube is under rolled, a tight joint is not provided and leaks may result. Heretofore, it has been a common practice to rely on the judgment of the workman to determine when the tube had been sufficiently expanded. However, human elements of error frequently resulted in over-expansion of the tube end, or under-expansion, distortion, destruction, etc. It can be readily seen, therefore, that automatic means for shutting off the motor-driven tool when a tube has been expanded to the proper amount, as determined by previous tests, or calculations, will result in uniform and accurate expansion with consequent reduction in labor costs and material costs, in initial operations and in repairs.

It is the primary object of this invention, not only in the specific application referred to above, but also in other uses where power shut-off is desired, to provide a control for automatically shutting off the power to the motor when a predetermined torque load is reached.

It is another object of this invention to provide means for selectively varying the stage at which the power shut-off will occur so that tubes of varying thicknesses, materials and other characteristics may be accommodated.

It is an advantage of this invention that the control may be provided for use on standard motors presently in existence as well as for incorporation conveniently in motors in which it will form a built-in structure.

It is another advantage of the invention that it may be readily employed in connection with portable motor-driven tools with only portions of the control needing to be carried with the motor, the remaining portions being adapted to be supported independently in a stationary position.

Other objects, uses and advantages will be obvious, or will appear, from the following written description, when taken in connection with the drawings in which.

Figure 1:
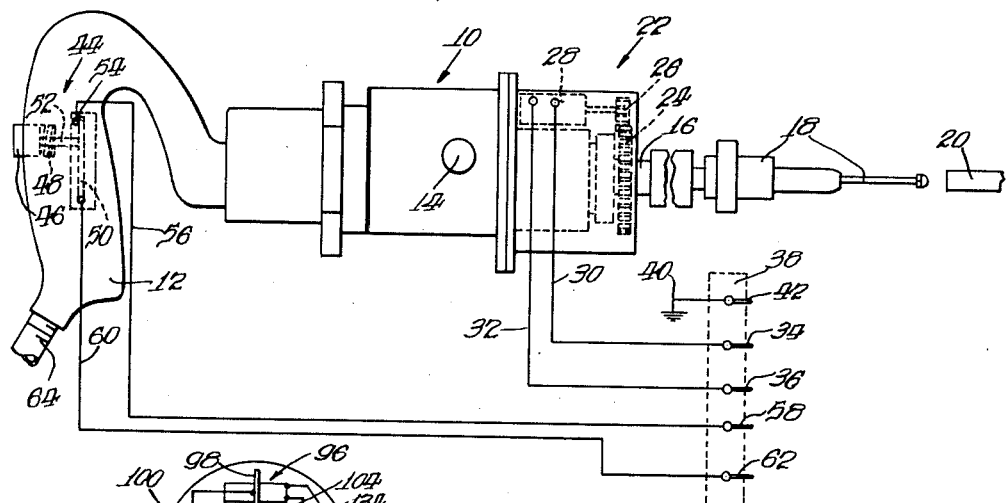
Figure 1 is a diagrammatic showing of a portable air motor carrying a tube expanding tool and with the electrical connections being shown diagrammatically leading to a five-prong male plug.
Figure 2:
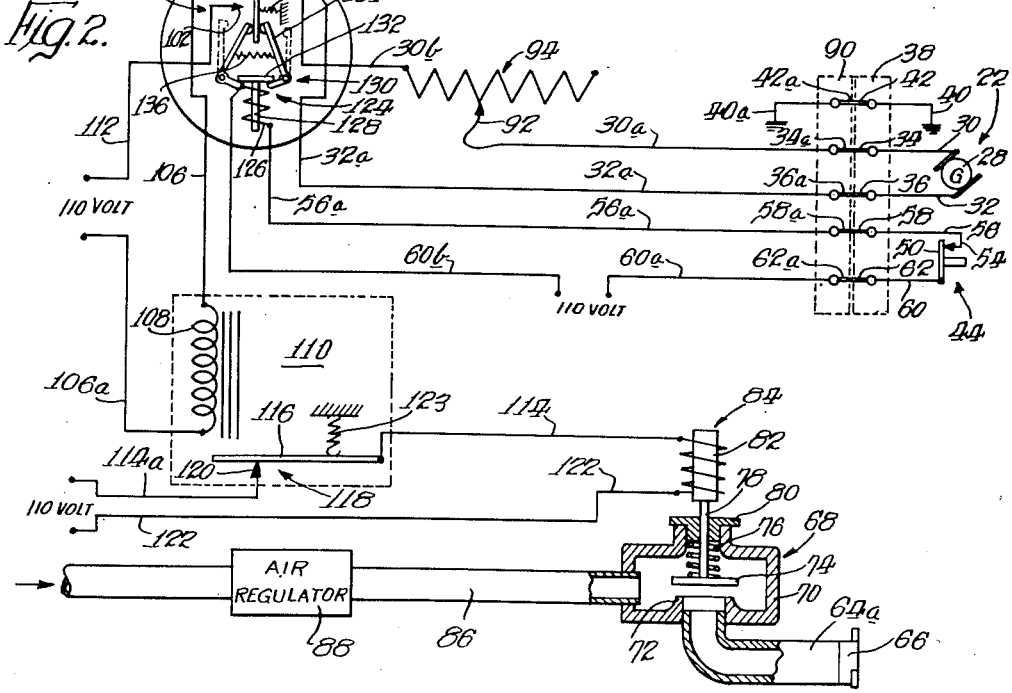
Figure 2 is a diagrammatic showing of an air valve and air regulator for supplying air by which the motor of Figure 1 is powered, together with a diagrammatic showing of the electric control structure, including those portions which are incorporated in the motor of Figure 1.

Referring first to Figures 1 and 2 of the drawings, there is indicated generally by the reference numeral 10 an air motor having a casing, a hand grip portion 12 and a combination handle and air throttle 14, the hand grip 12 and handle 14 being employed for grasping and manipulating the tool, with the handle 14 also permitting manual "off-on" control of the air pressure to the motor. A shaft 16 driven by the motor 10 may have secured to it a tool 18, which in the illustrated embodiment comprises a tube expander which is adapted to be inserted into the end of a tube, indicated fragmentarily at 20, for expanding the same. It will be appreciated that the driven shaft 16 might have secured to it other tools, the torque load of which is desired to be maintained at a certain level. The shaft might itself have substituted for it a driven member which has a cutting disc, abrasive wheel or cutting wheel, all of which are intended to be included within the term "driven shaft."

Electric generating means, indicated generally by the reference numeral 22, is carried by the motor 10 and may comprise, for example, a gear 24 mounted on the driven shaft 16 for rotation therewith, the gear being adapted to drive a pinion 26 connected with an electric generator 28, with the wires 30 and 32 of the generator being connected to the terminals 34 and 36 of the male plug 38. The male plug may also have a ground connection 40 and terminal 42.

A push button switch, indicated generally by the reference numeral 44, is adapted to be manually operated when the tool is employed for expanding the end of a tube. The switch includes the manual push button 46 which is spring-loaded by the spring 48 so that the movable switch member 50 carried on the rod 52 is normally urged toward closed position with contact 54, as shown. Contact 54 is connected by a wire 56 to a terminal 58 of the male plug 38 and a wire 60 is connected with the movable switch member 50 and connects with a terminal 62 of the male plug 38.

The hand grip 12 includes a passageway (not shown) for the delivery of air to the air motor 10, through a valve (not shown) under the control of handle 14, from the flexible air hose 64 which is adapted to have at its free end a coupling (not shown) for connection with a mating coupling 66 of the air hose 64a (see Figure 2). The other end of hose 64a is adapted to be connected with an off-on device in the form of an air valve, indicated generally by the reference numeral 68.

As may be seen in Figure 2, housing 70 of the valve 68 provides a seat 72 for a spring-loaded valve member 74, the spring 76 normally urging the valve member 74 to closed position. Valve member 74 is connected by rod 78 through an airtight sealing structure 80 with an armature 82 of an electromagnet, indicated generally by the reference numeral 84. The armature is actuated upwardly when the winding 83 of the electromagnet 84 is energized. Rod 78 then draws the valve member 74 upwardly from its seat 72 and against the action of the spring 76.

Leading into the valve housing 70 is an air conduit 86 in which is disposed an air regulator for ensuring that the air pressure delivered through the valve 68 to the air motor will be constant. Conduit 86 may be connected by suitable known means to a source of air pressure.

The remainder of the control structure can best be seen from Figure 2, with the electric generating means 22 and manual push button switch 44 being indicated diagrammatically in the upper right-hand portion of that figure.

The terminals 42, 34, 36, 58 and 62 of the male plug 38 are adapted to fit in corresponding sockets 42a, 34a, 36a, 58a and 62a of the female plug 90. Leading from terminal 42a to the ground is an electric wire 40a. From terminal 34a an electric wire 30a extends to a movable contact 92 of a variable resistor which is indicated generally by the reference numeral 94. From the resistor 94 the wire 30b extends to the field winding (not shown) of a small, sensitive relay, indicated generally by the reference numeral 96. The other end of the field winding of relay 96 is connected with the wire 32a leading to the terminal 36a of the female plug 90. From the foregoing, it will be seen that there is an electrical circuit including the generator 28, which is driven from the driven shaft 16 of the motor 10, wire 30, terminals 34 and 34a, wire 30a, movable contact 92 of the variable resistor 94, wire 30b, field winding of relay 96, wire 32a, terminals 36a and 36, and the wire 32 back to the generator. The field winding of the relay 96 is excited by the current generated by generator 28. The voltage developed by the generator is in proportion to the speed of the air motor 10 and when the driven shaft 16 has its speed decreased by torque load during the tube expanding operation, the output voltage of the generator will decrease. That voltage output, together with the setting of the resistor 94, will determine what current will be delivered to the relay 96. Relay 96 is intended to attract and hold a movable contact member 98 of a switch, indicated generally by the reference numeral 100. In such attracted position, the movable switch member 98 is out of contact with the fixed contact 102 of switch 100. The movable contact 98 is normally loaded toward closed position, for example, by a compression spring 104, but when the current generated by generator 28 is of a sufficient amount, it attracts the movable switch member 98 and opens switch 100. Member 98 and contact 102 are sometimes hereinafter referred to as relay-operated contacts.

Switch 100 has its movable contact member 98 connected by a wire 106 to the field winding 108 of a larger relay which is indicated generally by the reference numeral 110. From the other end of the field winding 108 a wire 106a is connected to a source of current, such as a 110 volt line, the other wire 112 from the source of current being connected with the fixed contact 102 of the switch 100. From the foregoing, it will be seen that an electrical circuit is provided which includes the fixed contact 102, wire 112, source of current, wire 106a, field winding 108 and wire 106 to the movable switch member 98 of the switch 100.

Another electrical circuit is provided which includes the electromagnet 84, as follows: Wire 114, movable switch member 116 of a switch, which is indicated generally by the reference numeral 118, thence to the fixed contact 120 and, by wire 114a, to a source of current, such as a 110 volt line. Member 116 and contact 120 are sometimes hereinafter referred to as relay-operated contacts. The other wire 122 from the source of current is then connected with the other end of the winding 83 of the electromagnet 84. With the switch 118 closed, as shown, the electromagnet 84 is energized and holds the movable valve member 74 off of its seat 72 whereby the valve 68 is in "on," or open, position. When switch 118 is opened by relay 110, then the electromagnet 84 is de-energized and the spring 76 of the valve 68 immediately urges the movable valve member 74 to its seat 72, so that the valve is placed in "off" or closed, position.

The manually controlled push button switch 44 (see Figure 2) is in circuit with an electromagnet, indicated generally by the reference numeral 124, as follows: fixed contact or terminal 54 of switch 44, wire 56, terminal 58 of the male plug 38, socket 58a of the female plug 90, and wire 56a to the winding 126 of the electromagnet 124. The circuit continues from the other end of the winding 126 by wire 60b to a source of current, such as a 110 volt line, and thence by wire 60a, socket 62a, terminal 62 and wire 60 to the movable switch member 50 of switch 44. The armature 128 of the electromagnet 124 actuates an electromagnetically operated device, indicated generally by the reference numeral 130, which device includes a block 132. When the armature is attracted, block 132 moves downwardly against the shorter arms of a pair of pivotally mounted bell crank levers 134 which then serve to position the movable switch member 98 of switch 100 away from the fixed contact member 102 to open the circuit which includes the relay 110. Normally, the bell crank levers 134 are separated by a compression spring 136, or by some similar means, so that when the electromagnet 124 is deenergized by opening of the manually controlled switch 44, the electromagnetically operated device 130 no longer serves to position the movable contact member 98 away from its fixed contact 102.

The operation of the control structure is as follows: The air hose 64 connected with the handle 12 of the motor 10 is first coupled to the hose 64a. This is done before the male plug 38, connected with the motor 10, is plugged into the female plug 90. After the hose portions 64 and 64a are connected together, the plugs 38 and 90 are connected without the manually controlled push button 44 being depressed.

When the plugs 38 and 90 are interconnected, the electrical circuit including the generator 28 and the small relay 96 is not energized, since the generator is not being driven and since the circuit is not otherwise powered. The circuit including the manually controlled push button switch 44 is energized and consequently the electromagnet 124 is energized and the electromagnetically operated device 130 is operated by downward movement of the plate 132 carried on the armature 128. By this movement the bell cranks 134 are pivoted about their pivotal connections toward each other and against the force of the compression spring 136 to assure that the movable contact member 98 of switch 100 is separated from the fixed contact member 102. As a result of switch 100 being open, the relay circuit which includes relay 110, is not energized and therefore the movable switch member 116 is not actuated by the relay 110. Consequently, the movable switch member 116 engages the fixed contact 120 under the urging of the compression spring 123 and the circuit including the electromagnet 84 is therefore energized and the valve member 74 is drawn up by the electromagnet 84 against the operation of the spring 76. Consequently, air is supplied through the air regulator and conduit 86 and through the valve 68 and conduits 64a and 64 to the valve or throttle (not shown) of the air motor 10.

The next step in the operation is for the user to manipulate the air throttle handle 14 of the air motor to admit air to the motor to power the same and to bring it up to operating speed. While this is being done, the manually controlled push button 44 is still not depressed, since, if it were depressed before the air motor reached a predetermined speed, the circuit which includes the manually operated switch 44 would be de-energized, whereupon the electromagnetically operated device 130 would cease to position the movable switch member 98 of switch 100 as shown in Figure 2, and said switch member 98 would be urged into contact with the fixed contact 102 by spring 104. That movement would close the circuit which includes the relay 110 and immediately the movable switch member 116 of switch 118 would be drawn upwardly against the compression spring 123 to open the circuit which includes the electromagnet 84. If the electromagnet 84 is de-energized in that fashion, spring 76 will urge the movable valve member 74 onto its seat 72 and cut off the air pressure to the air motor.

However, when the air motor is brought up to operating speed, and that occurs very quickly, the generator 28 will generate sufficient current that the relay 96 will attract the movable switch member 98 of switch 100 against the operation of the spring 104 and therefore prevent the closing of switch 100 even if the electromagnetically operated positioning device 130 no longer is effective.

Consequently, when the air motor has reached its full operating speed, the user then grips the handle 12 of the air motor 10 in a natural fashion and thereby causes the push button 46 of the manually controlled switch 44 to be depressed against the action of the spring 48 and to open the switch 44 by moving the movable switch member 50 away from the fixed contact 54. Thereupon, that circuit is opened, the electromagnet 124 is de-energized, and the spring 136 forces the bell crank levers 134 apart. Then the user, by grasping the handle 14 and the hand grip 12, applies the expanding tool 18 into the end of a tube, such as tube 20, to expand the same.

Depending upon the characteristics of the tube 20, the extent of expansion desired, etc., the user will have first adjusted the variable resistor 94 by moving its movable contact 92 to a location corresponding to the torque load at which it is desired to shut off the power to the motor. The variable resistor 94 can be calibrated in various manners, for example, in accordance with the metals of which the tubes are formed or in other manners. This provides a flexibility to the control structure which is very advantageous.

At such time as the tube expanding tool 18 is slowed down by engagement with the inner walls of the tube 20 to a point where the predetermined torque load has been reached, the current generated by the generator 28 will drop off, and the current supplied to the winding of the small relay 96 will diminish, to a point where it will no longer hold the movable switch member 98 of switch 100 against the action of spring 104. Thereupon, switch member 98 will immediately move to the left, as viewed in Figure 2, and engage the fixed contact 102 of switch 100 and close the circuit, which includes the relay 110.

As soon as the relay 110 is energized, it attracts the movable switch member 116 of switch 118 to open the switch and thereby immediately de-energize the electromagnet 84 to permit the spring 76 of the valve 68 to seat movable valve member 74 and to shut off the supply of air pressure to the air motor 10. The expanding tool 18 is then withdrawn from tube 20.

Then, before expanding the next tube, the user may either turn the control handle 14 to "off" position to close off the supply of air to the motor (independently of the already closed valve 68), or he may simply release the push button control 44 whereupon its circuit will be closed to cause an energization of electromagnet 124. The electromagnetically controlled positioning device 130 will then be actuated to move the movable contact member 98 of switch 100 away from the fixed contact 102 to thereby open the circuit which includes the relay 110. As soon as the relay 110 is so de-energized, the spring 123 will move the movable switch member 116 of switch 118 into closed position into engagement with contact 120. The circuit including electromagnet 84 will thereupon be closed and the electromagnet will be energized and the valve 68 will be opened to again supply air to the motor 10, if the control handle 14 has not shut off the supply of air to said motor. As soon as the motor is up to normal operating speed; the user will then grip the hand 12 in such a fashion as to depress the manually controlled switch 44, whereupon another tube end may be expanded.

Figure 3:
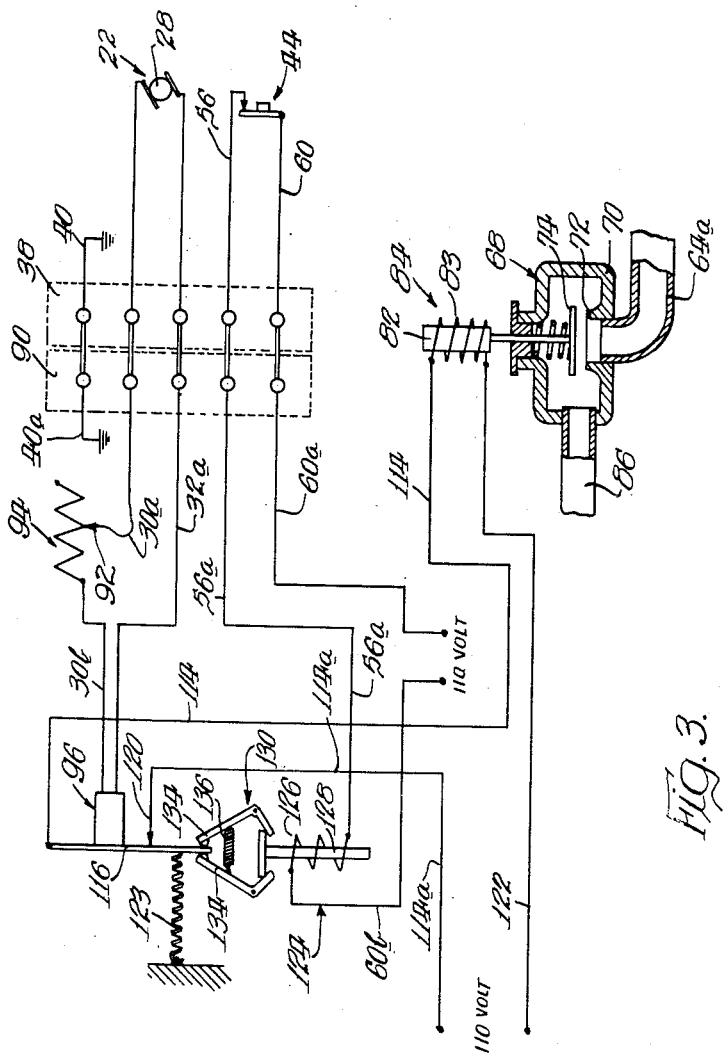
Figure 3 is a view similar to Figure 2, but illustrating a modification of the electric control structure.

If reference will now be made to Figure 3, a modification of the control structure of Figure 2 will be described. The same reference numerals as have been employed in Figure 2 are used in Figure 3, the main difference between the structure of Figure 3 and of Figure 2 being that the electrical circuit which includes the relay 110 is eliminated. The relay 96, instead, is shown actuating the movable switch member 116 directly. This eliminates the electrical circuit which includes the switch 100 and relay 110. The circuit including the generator 28, resistor 94 and relay 96 is the same and the circuit including the manually operated push button switch 44 and the electromagnetically operated device 130 is the same.

However, in order to actuate the movable switch member 116 appropriately in order to provide the control operation described above with respect to Figure 2, the spring 123 is arranged to urge the switch member 116 away from the fixed contact 120 while the electromagnetically operated positioning device 130 is adapted to position it in engagement with the contact 120. When the relay 96 is sufficiently energized by the generator 28, it attracts the movable switch member 116 into engagement with the contact 120 and against the force of spring 123, irrespective of the electromagnetically operated positioning device 130.

A control structure of this form will be satisfactory if the relay 96 is strong enough and the current generated is sufficient. Otherwise, the control structure shown in Figure 2 may advantageously be employed. The operation of the air motor and the control structure, so far as the sequence of operations by the user is concerned, is the same in the control structure of Figure 3 as in Figure 2.

While I have illustrated preferred embodiments of the invention, that is for purposes of illustration only and I do not intend the invention to be limited thereto, except insofar as the following claims are so limited, since modifications or changes coming within the scope of the invention will suggest themselves to others by reason of my disclosure.

I claim:

1. Control structure for use in controlling the delivery of power to a motor-driven shaft or the like, said control structure comprising an electrically powered off-on device adapted to control the delivery of power to a motor; a switch controlling the operation of said off-on device; electric generating means adapted to be driven from a driven shaft; structure responsive to the current generated by said electric generating means for maintaining the switch in a position whereby the off-on device is in "on" position when the current generated remains above a certain level; and selective means for selectively maintaining said switch in a position whereby the off-on device is in "on" position, independent of the action of said electric generating means.

2. The control structure of claim 1 wherein the selective means comprises an electromagnet, a switch positioning device actuated thereby, an electrically powered circuit including the field winding of the electromagnet and a manually operated switch, the latter switch normally maintaining the circuit in a condition whereby the switch positioning device positions the first named switch so that the off-on device is in "on" position, independent of the action of the electric generating means; and said manually operable switch being movable to a second position to thereby remove said first named switch from the effect of the selective means.

3. Control structure for use in controlling the delivery of power to a motor-driven shaft or the like, said control structure comprising an electrically powered off-on device adapted to control the delivery of power to a motor; a switch controlling the operation of said off-on device; electric generating means adapted to be driven from a driven shaft; structure responsive to the current generated by said electric generating means for maintaining the switch in a position whereby the off-on device is in "on" position when the current generated remains above a certain level; said responsive structure including a relay in series with said electric generating means, an electrically powered circuit having a relay and having a switch under the control of said first named relay, with the switch controlling the off-on device being under the control of the second named relay; and manually controlled means for selectively maintaining the first named switch in a position whereby said off-on device is in "on" position, independent of the action of said electric generating means.

4. Control structure for use in controlling the delivery of air pressure to an air motor for driving a driven shaft, said control structure comprising a valve normally loaded toward closed position and adapted to control the delivery of air pressure to an air motor; electric generating means adapted to be driven from a driven shaft; valve actuating means responsive to the current generated by said electric generating means and including a relay energized by the electric generating means; an electrical circuit having electrically powered means for moving the valve against its loading means to open position; a normally closed switch in said circuit, said switch being controlled by said relay and being maintained closed when the current generated by said electric generating means remains above a certain level; and manually controlled means for maintaining said switch in closed position even when the current generated by said electric generating means is below said certain level.

5. In a motor overload control system for a fluid pressure operated motor having a driven shaft and a fluid supply conduit leading thereto, a valve disposed in a conduit and movable between open and closed positions, yieldable means normally maintaining said valve in its closed position, a solenoid operatively connected to said valve and operable upon energization thereof to move the valve to its open position against the action of said yieldable means, a circuit for said solenoid, a first pair of normally closed relay-operated contacts in said circuit, a first relay magnet operable upon energization thereof to open said contacts, a circuit for said magnet including a second pair of normally closed relay-operated contacts, a solenoid operatively associated with said second pair of normally closed relay-operated contacts and operable upon energization thereof to maintain the latter open, a circuit for said latter solenoid including a pair of normally closed push button operated contacts, a push button for operating said push button contacts to open the same, an electric generator having an output circuit and responsive to the speed of rotation of a driven shaft, a second relay magnet disposed in said generator circuit and responsive to a predetermined flow of current generated in the circuit for opening said second pair of normally closed relay operated contacts.

WILLIAM H. McELVENNY.

References Cited in the file of this patent

UNITED STATES PATENTS

| Number | Name | Date |
|---|---|---|
| 1,717,302 | Bany | June 11, 1929 |
| 1,778,644 | Place | Oct. 14, 1930 |
| 1,936,620 | Crout | Nov. 28, 1933 |
| 1,947,430 | De Mooy | Feb. 13, 1934 |
| 1,977,691 | Norling | Oct. 23, 1934 |
| 2,467,582 | Corkran | Apr. 19, 1949 |